US009195531B2

(12) United States Patent
Loewenstein et al.

(10) Patent No.: US 9,195,531 B2
(45) Date of Patent: Nov. 24, 2015

(54) PROCESSOR DESIGN VERIFICATION

(71) Applicant: Oracle International Corporation, Redwood Shores, CA (US)

(72) Inventors: Paul N. Loewenstein, Palo Alto, CA (US); Basant Vinaik, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 185 days.

(21) Appl. No.: 13/956,171

(22) Filed: Jul. 31, 2013

(65) Prior Publication Data

US 2015/0039940 A1 Feb. 5, 2015

(51) Int. Cl.
| G06F 11/00 | (2006.01) |
| G06F 11/07 | (2006.01) |
| G06F 11/26 | (2006.01) |
| G06F 12/00 | (2006.01) |
| G06F 9/38 | (2006.01) |

(52) U.S. Cl.
CPC .............. *G06F 11/0751* (2013.01); *G06F 9/38* (2013.01); *G06F 11/0721* (2013.01); *G06F 11/26* (2013.01); *G06F 12/00* (2013.01)

(58) Field of Classification Search
CPC ............ G06F 11/0751; G06F 11/0706; G06F 11/0763; G06F 11/26; G06F 11/261; G06F 11/3024; G06F 11/3447; G06F 11/3457; G06F 12/00; G06F 9/38
USPC ......... 714/30, 37, 25, 28, 29, 33, 47.1, 48, 49
See application file for complete search history.

(56) References Cited

U.S. PATENT DOCUMENTS

| 2008/0115027 A1* | 5/2008 | Geller et al. ................... 714/738 |
| 2008/0133205 A1* | 6/2008 | Adir et al. ....................... 703/15 |
| 2009/0144045 A1* | 6/2009 | Kanade ............................ 703/21 |
| 2012/0054560 A1* | 3/2012 | Adir et al. ....................... 714/54 |

OTHER PUBLICATIONS

Brown, G.M; "Asynchronous Multicaches;" Distributed Computing; Jan. 1990 (6 pages).
Condon, Anne E., Hill, M.D., Plakal, M. and Sorin, D.J; "Using Lamport Clocks to Reason About Relaxed Memory Models," 5th International Symposium on High-Performance Computer Architechture, Jan. 1999 (9 pages).
Manovit, C. and Hangal, S; "Efficient Algorithms for Verifying Memory Consistency;" SPAA '05, Jul. 2005, (8 pages).
Roy, A., Zeisset, S., Fleckenstein, C.J. and Huang, J.C; "Fast and Generalized Polynomial Time Memory Consistency Verification;" Intel Corporation; May 2006 (15 pages).

(Continued)

*Primary Examiner* — Joseph D Manoskey
(74) *Attorney, Agent, or Firm* — Osha Liang LLP

(57) ABSTRACT

A system and method for verifying that a processor design having caches conforms to a specific memory model. The caches might not be maintained coherent in real time. Specifically, the system and method make use of a checker that conforms to the memory model, a time-stamping scheme, and a store buffering scheme to identify a bug(s) in the processor design that violates the memory model and/or loads an incorrect value in response to a load instruction.

20 Claims, 5 Drawing Sheets

(56) References Cited

OTHER PUBLICATIONS

Sorin, D.J., Plakal, M., Hill, M.D. and Condon, A.E; "Lamport Clocks: Reasoning About Shared Memory Correctness;" Computer Sciences Department, University of Wisconsin, Madison; Mar. 1998 (40 pages).

Lowenstein, P., Chaudhry, S., Cypher, R., and Manovit, C; "Multiprocessory Memory Model Verification," Federated Logic Conference; Aug. 2006 (20 pages).

* cited by examiner $$m <_M m' \iff t_3 < t'_3 \lor (t_3 = t'_3 \land (t_2 < t'_2 \lor (t_2 = t'_2 \land t_1 < t'_1)))$$

FIG. 3A $$m <_M m' \iff t_3 < t'_3 \lor (t_3 = t'_3 \land t_2 < t'_2)$$

FIG. 3B $$m' <_M m \iff t'_3 < t_3 \lor (t'_3 = t_3 \land t'_2 \leq t_2)$$

FIG. 3C $$m <_M m' \iff t_3 < t'_3 \lor (t_3 = t'_3 \land t_2 < t'_2)$$

FIG. 3D

PROCESSOR DESIGN VERIFICATION

BACKGROUND

Today's microprocessor clock frequencies are at multiple GHz, with execution units capable of executing several instructions per clock cycle. By contrast, memory access times have remained stubbornly static as the execution rate of processors has increased. A processor may be able to execute around a thousand instructions in the time taken to perform a single access to main memory.

Despite the use of caches to hide much of this latency for many memory accesses, a significant proportion of accesses miss in the caches and have to access main memory directly. If a processor stalls on such accesses, considerable performance can be lost. Another approach is to allow the processor to speculatively execute past such long latency instructions, thereby executing instructions out of order. Considerable bookkeeping is required to ensure that the results of the execution are consistent with executing instructions, including memory-accessing instructions, in program order.

The move towards chip multiprocessing (CMP) processors requires the integration of multiprocessor cache coherence on the same chip as the execution pipelines. The interaction between the execution pipelines and the memory system can be quite complex, especially when the pipelines execute instructions out of order.

SUMMARY

In general, in one aspect, the invention relates to a method for verifying that a processor design conforms with a specified memory model. The method includes: receiving, from a simulation of the processor design and by a checker conforming to the memory model, a memory-committed (MC) confirmation for a load instruction executed by a strand in the processor design; obtaining, by the checker and in response to the MC confirmation for the load instruction, a load timestamp associated with the load instruction and a plurality of caches in the processor design; inserting, into a load queue of the checker corresponding to the strand, a load entry comprising the load timestamp in response to the MC confirmation for the load instruction; receiving, by the checker and after inserting the load entry into the load queue, a strand-committed (SC) confirmation for the load instruction from the simulation of the processor design; determining, by the checker and in response to the SC confirmation for the load instruction, a snapshot for the load instruction based on the load timestamp; obtaining a load value for the load instruction from the simulation of the processor design; and determining an error in the processor design by comparing the load value and the snapshot.

In general, in one aspect, the invention relates to a system for verifying that a processor design conforms with a specified memory model. The system includes: a plurality of caches; and a strand configured to obtain a load value by executing a load instruction; a timestamp engine configured to generate a load timestamp in response to a memory-committed (MC) confirmation for the load instruction from the simulation; a checker conforming to the memory model and comprising: a store queue for the strand; a load queue for the strand configured to store a load entry with the load timestamp in response to the MC confirmation; and a global store buffer accessed to determine a snapshot for the load instruction in response to a strand-committed (SC) confirmation for the load instruction, wherein the SC confirmation is from the simulation; and a verification engine configured to determine an error in the processor design by comparing the load value and the snapshot.

In general, in one aspect, the invention relates to a non-transitory computer readable medium storing instructions for verifying that a processor design conforms with a specified memory model. The instructions comprise functionality for: receiving, from a simulation of the processor design and using a checker conforming to the memory model, a memory-committed (MC) confirmation for a load instruction executed by a strand in the processor design; obtaining, using the checker and in response to the MC confirmation for the load instruction, a load timestamp associated with the load instruction and a plurality of caches in the processor design; inserting, into a load queue of the checker corresponding to the strand, a load entry comprising the load timestamp in response to the MC confirmation for the load instruction; receiving, using the checker and after inserting the load entry into the load queue, a strand-committed (SC) confirmation for the load instruction from the simulation of the processor design; determining, using the checker and in response to the SC confirmation for the load instruction, a snapshot for the load instruction based on the load timestamp; obtaining a load value for the load instruction from the simulation of the processor design; and determining an error in the processor design by comparing the load value and the snapshot.

Other aspects of the invention will be apparent from the following description and the appended claims.

BRIEF DESCRIPTION OF DRAWINGS

FIGS. 3A, 3B, 3C, and 3D show the memory-ordering of memory operations in accordance with one or more embodiments of the invention.

DETAILED DESCRIPTION

Figure 1:
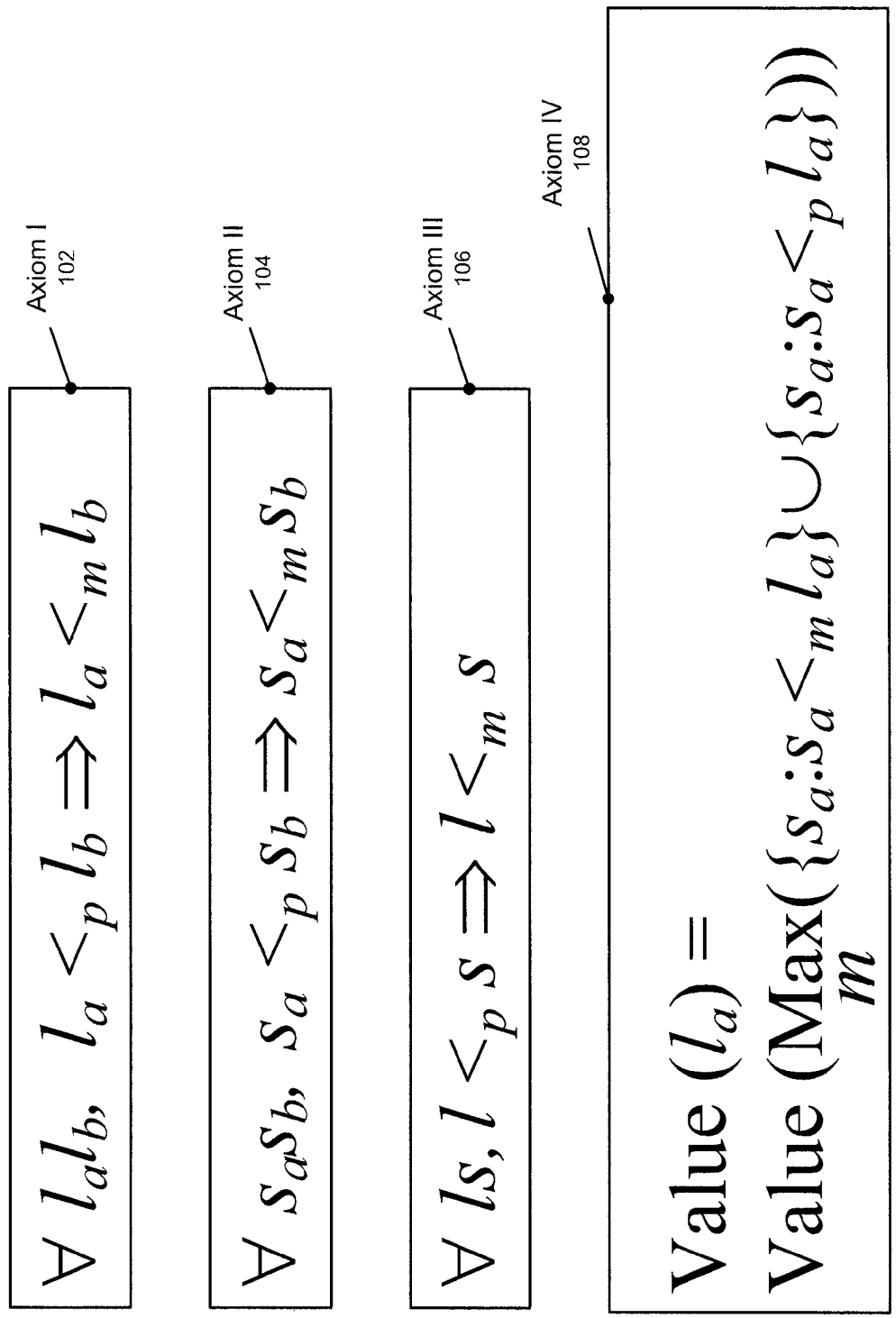
FIG. 1 shows a set of axioms of a specific memory model in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a system and method for verifying that a processor design having caches conforms to a specific memory model. The caches might not be maintained coherent in real time. Specifically, the system and method make use of a checker that conforms to the memory model, a time-stamping scheme, and a store buffering scheme to identify a bug(s) in the processor design that violates the memory model and/or loads an incorrect value in response to a load instruction.

In one or more embodiments of the invention, a memory model is a specification designed for programmers, by defining what results are legal for an arbitrary single or multiprocessor program. There is no concept of time in the specification; rather, the specification uses program order (the order that instructions are programmed to execute on any single processor) and a memory order.

Let $<_p$ denote program order. Variable l ranges over loads and variable s ranges over stores. Let a subscripted variable denote a memory operation to the address donated by the subscript (e.g., a variable $s_\alpha$ ranges over stores to address $\alpha$). For every execution, there exists a memory order $<_m$ over all loads and stores.

FIG. 1 shows a set of axioms (i.e., Axiom I (102), Axiom II (104), Axiom III (106), Axiom IV (108)) in accordance with one or more embodiments of the invention. Axiom I (102) states that a load program-ordered before another load is also memory-ordered before that load. Axiom II (104) states that a store program-ordered before another store is also memory-ordered before that store. Axiom III (106) states that a load program-ordered before any store is also memory-ordered before that store. Finally, Axiom IV (108) states that that the value of a load to address $\alpha$ is the value of the latest store in memory order that is either program-ordered before the load or memory-ordered before the load. In the memory model, the memory order $<_m$ over all loads and stores is constrained by the axioms (102, 104, 106, 108).

In one or more embodiments of the invention, a processor design conforms to the memory model if there exists a memory order for the result of a program execution by the processor design satisfying the 4 axioms (102, 104, 106, 108).

Figure 2:
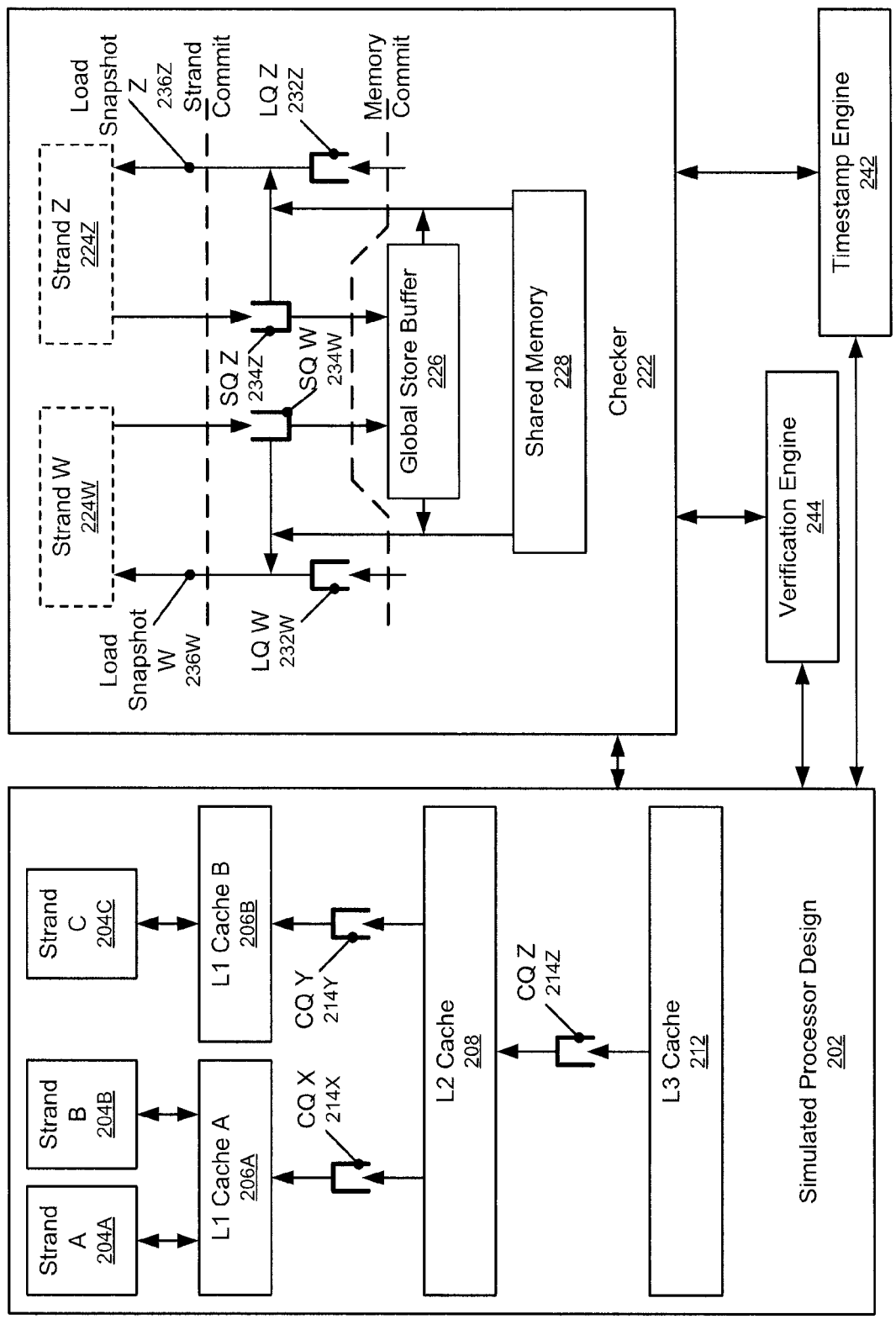
FIG. 2 shows a system in accordance with one or more embodiments of the invention.

FIG. 2 shows a system (200) in accordance with one or more embodiments of the invention. The system (200) has multiple components including a simulation of a processor design (202), a checker (222), a timestamp engine (242), and a verification engine (244). Each of these components may be located on the same hardware computing device (e.g., desktop, laptop, server, mainframe, laptop, workstation, kiosk, mobile device, etc.) or may be located on different computing hardware connected by a network having wired and/or wireless segments.

In one or more embodiments of the invention, the system (200) includes the simulation of the processor design (202). The processor design is effectively the device under test (DUT). As shown in FIG. 2, the simulated processor design (202) has one or more strands (i.e., Strand A (204A), Strand B (204B), Strand C (204C)) operatively connected to one or more cache memories (i.e., L1 Cache A (206A), L1 Cache B (206B), L2 Cache (208), L3 Cache (212)). Each strand behaves logically as a computer. Accordingly, the strands may correspond to computing cores in a processor and/or threads of execution in a single computer core. Although strands (204A, 204B, 204C) may share resources (e.g., cache memory), each strand executes an independent instruction stream having one or more load instructions (i.e., loads) and/or one or more store instructions (i.e., stores).

In one or more embodiments of the invention, there are two temporal events associated with each load or store: (i) Strand-committing, when the architectural state of the strand is irrevocably updated; and (ii) Memory-committing, when a store can affect other strands' loads, or when a load ceases to see other strands' stores.

In one or more embodiments of the invention, for stores, memory-committing cannot occur before strand-committing; the memory-committing of the store irrevocably changes the state of memory, which should not be performed until the strand's architectural state reflects the execution of the store.

In one or more embodiments of the invention, for loads, strand-committing cannot occur before memory-committing, because the new architectural state of the strand is dependent on the load's value.

In the DUT, for any given strand (204A, 204B, 204C), memory-committing occurs in memory order. However, because different strands may access memory locations using different caches and the caches are not maintained coherent in real-time, the time of the memory-committing events cannot be used as a witness for the memory order between memory operations by different strands.

In the DUT, the caches (206A, 206B, 208, 212) store copies of a memory location, together with information on whether an executing strand (204A, 204B, 204C) attached to that cache has read access rights (can perform a load from the cache) or has write access rights. Stores are typically performed at a specific cache level. Write access rights either permit stores at that level, or allow the transfer of the access rights to an inner cache where the store can be performed. For some DUTs, the outermost caches (i.e., the L3 caches including L3 Cache (212)) may be maintained in real-time.

In the DUT, to obtain access rights, a cache (206A, 206B, 208, 212) sends a request to the next cache further away from the executing strands (next higher level). If that cache has the desired access rights, then those access rights can be granted to the requesting cache. In one or more embodiments of the invention, to obtain write access, that may require the revocation of access rights held by other caches (attached to the granting cache) closer to the other executing strands. These changes of access rights propagate through cache queues (CQ) (i.e., CQ X (214X), CQ Y (214Y), CQ Z (214Z)) from the outer caches towards the inner caches (i.e., towards the caches closer to the executing strands (204A, 204B, 204C)).

In the DUT, there is no need for a granting cache to wait for access right revocation to propagate to one cache before granting conflicting access rights to a requesting cache, as long as the access right grants propagate through the same queues as any access right revocation (this rule applies across all memory locations accessed).

In the DUT, the cache queues (214X, 214Y, 214Z) do not need to be strict first-in first-out (FIFOs). The ordering rule is that access right grants do not pass access right revocations. Some additional bookkeeping is required if access right revocations are allowed to pass access right grants for the same memory location.

Often, data as well as access rights need to be transferred to the requesting cache. The transfer of this data imposes additional ordering constraints and the draining of the access rights queues may be delayed while waiting for data. However, the ordering rules for access right changes through the queues still applies even when data transfer constraints are applied.

Although FIG. 2 shows the simulated processor design (202) with three strands (204A, 204B, 204C), two L1 caches (206A, 206B), one L2 Cache (208), and one L3 Cache (212), in other embodiments of the invention, the processor design may have any number of strands and any hierarchy of caches, with any number of caches within each level of the hierarchy.

Some DUTs may not maintain their outermost caches real-time coherent. For example, a DUT constructed along the lines described in the document entitled: "Asynchronous Multicaches" by Geoffrey M. Brown, Distributed Computing, 1990, 4:31-36, Springer Verlag (hereinafter "Brown"), does not maintain its outermost caches real-time coherent. In such a DUT, the existential witness for the memory order involves timestamps derived from the DUT interconnect (in the case of Brown, the time or sequence number of the global broadcast of each request for access rights). The timestamps in such a DUT propagate to the outermost caches in the same way as they propagate between different levels of caches as already described. Brown is hereby incorporated by reference in its entirety.

As shown in FIG. 2, the system (200) includes a timestamp engine (242). The timestamp engine (242) is configured to timestamp each access right grant from the L3 cache (212) to the L2 Cache (208) with the time (as read from the L3 clock) that the grant is placed in CQ Z (214Z) (the L3 timestamp). The timestamp engine (242) is configured to maintain an L3 timestamp for each L2 cache (208). Upon receiving an access right grant, if the grant's L3 timestamp is later than the L2's, the L2's L3 timestamp is updated to be equal to the grant's L3 timestamp. If the cache queues maintain order between the grants, then the update can be unconditional.

In one or more embodiments of the invention, the timestamp engine (242) is configured to timestamp each access right grant from the L2 cache (208) to an L1 cache (206A, 206B) with $(t_3, t_2)$, where $t_3$ is the current L3 timestamp at the L2 cache (208) and $t_2$ is the time (as read from the L2 clock) at the L2 cache (208) that the grant was enqueued to the L1 cache (206A, 206B). In one or more embodiments of the invention, the timestamp engine (242) maintains, for each L1 cache (206A, 206B), an order stamp pair $(t_3, t_2)$, updating it as the L2 updates the L3 timestamp using the following definition of "is later than":

If $t_3=t_3'$, $(t_3, t_2)$ is later than $(t_3', t_2')$ if and only if $t_2$ is later than $t_2'$, otherwise $(t_3, t_2)$ is later than $(t_3', t_2')$ if and only if $t_3$ is later than $t_3'$.

The timestamp engine (242) may extend this timestamping scheme through any number of levels in a cache hierarchy. In other words, although FIG. 2 only shows 3 levels of cache, this timestamping scheme may be extended to 4 levels of cache, 5 levels of cache, etc. Those of ordinary skill in the art, having the benefit of this detailed description, will appreciate that this timestamping scheme does not require synchronized clocks between the different caches receiving access rights changes through the cache queues (214X, 214Y, 214Z); each cache (206A, 206B, 208) can maintain its own independent clock. If multiple L3 caches (e.g., L3 Cache (212)) exist and if those caches are relied on being maintained coherent in real-time, then a single clock is used for all the $t_3$ timestamps.

In the DUT, in response to a store instruction, instead of storing to an L1 (writeback) cache, it is possible to store to another cache (usually an L2 cache), "writing through" the L1 cache. There is a choice of whether to invalidate any matching entry in an L1 cache, or to update it. Invalidation is merely an access right revocation, and can be propagated through the L2-cache-to-L1-cache queue (214X, 214Y) as for any other revocation. Updating is logically a revocation (for the old value) followed by a grant (for the new value) and are therefore ordered as both a revocation and a grant (other grants, including updates, may not pass an update, and an update may not pass other grants (including updates)).

In one or more embodiments of the invention, the timestamp engine (242) is configured to generate timestamps for all load instructions upon memory-commit. A timestamp is generated for each load instruction executed by a strand according to its memory-commit with respect to the strand's L1 cache. The timestamp for each load timestamp is a triple: $(t_3, t_2, t_1)$, where $(t_3, t_2)$ is the order stamp maintained for the L1 cache and $t_1$ is the time (as read from the L1 clock) of the memory-committing of the load instruction at the L1 cache.

In one or more embodiments of the invention, the resolution of the L1 clock is sufficient to unambiguously order loads from the same strand. If the processor design can memory-commit multiple loads per strand per L1 clock cycle, then the simulation may need to advance the L1 clock more than once per processor design hardware clock cycle. A cache's local time need not be maintained in consistent units, either with respect to real-time or with respect to other caches, except when a single time-stamping scheme is applied across multiple real-time coherent caches (such as L3 Cache (212)).

In one or more embodiments of the invention, the timestamp engine (242) is configured to generate timestamps for all store instructions upon memory-commit. For a writeback L1 cache, stores take similar triple timestamps as loads. If the L1 cache is write-through, stores take a double timestamp $(t_3, t_2)$, where $t_2$ is the time (as read from the L2 clock) the store memory-commits to the L2 cache. The resolution of the L1 clock (for a writeback L1 cache) or L2 clock (for a write-through L1 cache) is sufficient to unambiguously order stores from the same strand.

If the processor design can memory-commit multiple stores per strand per hardware clock cycle, then the simulation may need to advance local cache time more than once per processor clock cycle. A cache's local time need not be maintained in consistent units, neither with respect to real time nor with respect to other caches.

FIG. 3A sets forth the memory order ($<_M$) of two memory operations m and m' having triple timestamps $(t_3, t_2, t_1)$ and $(t_3', t_2', t_1')$, respectively, in accordance with one or more embodiments of the invention.

A double timestamped store may be consistently assigned a triple timestamp by adding a $t_1$ component that is less than the $t_1$ component of all "real" triple timestamps. FIG. 3B sets forth the memory order ($<_M$) of memory operation m having triple timestamp $(t_3, t_2, t_1)$ and memory operation m' having a double timestamp $(t_3', t_2')$, in accordance with one or more embodiments of the invention.

FIG. 3C sets forth the memory order ($<_M$) of a memory operation m' having a double timestamp $(t_3', t_2')$ and a memory operation m having a triple timestamp $(t_3, t_2, t_1)$, in accordance with one or more embodiments of the invention.

FIG. 3D sets forth the memory order ($<_M$) of two memory operations m and m' having double timestamps $(t_3, t_2)$ and $(t_3', t_2')$, respectively, in accordance with one or more embodiments of the invention.

In one or more embodiments of the invention, the system (200) includes a checker (222). The checker (222) is executed in parallel with the simulated processor design (202). The checker (222) conforms to the memory model. In other words, the checker (222) operates in accordance with the four axioms (i.e., Axiom I (102), Axiom II (104), Axiom III (106), and Axiom IV (108)), discussed above in reference to FIG. 1.

As shown in FIG. 2, the checker (222) has multiple components including a shared memory (228), a global store buffer (226), one or more load queues (LQs) (i.e., LQ W (232W), LQ Z (232Z)), and one or more store queues (SQs) (i.e., SQ W (234W), SQ Z (234Z)). In one or more embodiments of the invention, the checker (222) includes one or more strands (i.e., Strand W (224W), Strand Z (224Z)), each corresponding to one of the strands (204A, 204B, 204C) in the simulated processor design (202). Those skilled in the art, having the benefit of this detailed description, will appreciate that the strands (224W, 224Z) in the checker (222) may be optional.

In one or more embodiments of the invention, the checker (222) includes the shared memory (228). The shared memory (228) is a sparse address-indexed array of data values. In other words, the shared memory (228) contains data values as a function of address. In one or more embodiment of the invention, the shared memory (228) is implemented on a 64-bit granularity. In one or more embodiments of the invention, the shared memory (228) is implemented on a cacheline granularity. The shared memory (228) and the Global Store Buffer (226) mirror the state of the processor design's memory locations (cached or in main memory) exercised during the simulation. The Global Store Buffer (226) takes into account the lack of real-time coherence between the caches and may contain multiple values (with different timestamps) for the same memory location.

In one or more embodiments of the invention, there exists one SQ (SQ W (234W), SQ Z (234Z)) per strand (204A, 204B, 204C). Each SQ (234W, 234Z) includes store entries corresponding to strand-committed store instructions, executed by the simulated processor design (202), that are yet to be memory-committed. The store entries are arranged within the SQs (234W, 234Z) according to the program order of the store instructions. In one or more embodiments of the invention, the store entries in the SQs (234W, 234Z) include the values to be stored but do not include timestamps.

In one or more embodiments of the invention, the global store buffer (226) models the effect of non-real-time coherence between the caches (206A, 206B, 208, 212), which are not directly modeled. The global store buffer (226) includes the store entries of store instructions that have been memory-committed. In other words, following the memory-committing of store instructions, the corresponding store entries in the SQs (234W, 234Z) are moved to the global store buffer (226). A store entry in the global store buffer (226) includes the store timestamp obtained from the timestamp engine (242).

For example, assume SQ W (234W) corresponds to Strand B (204B). In response to Strand B (204B) strand-committing a store instruction during simulation of the processor design (202), a store entry corresponding to the store instruction is enqueued into SQ W (234W). The strand-committing of the store instruction is signaled by the simulation of the processor design (202). The subsequent memory-committing of the store instruction is also signaled by the simulation of the processor design (202). In response to the memory-committing, the store entry is moved from SQ W (234W) and into the global store buffer (226), and updated/populated with the store timestamp from the timestamp engine (242).

A store entry in the global store buffer can be retired and modify the shared memory (228) once any future load is necessarily timestamped after that entry, and all entries for the same memory location are timestamped after that entry (i.e., the entries in the global store buffer are retired in timestamp order per memory location).

In one or more embodiments of the invention, there exists one LQ (LQ W (232W), LQ Z (232Z)) per strand (204A, 204B, 204C). Each LQ (232W, 232Z) includes load entries corresponding to memory-committed load instructions, executed by the simulated processor design (202), that are yet to be strand-committed. The load entries include a timestamp but might not include a data value. Upon strand commit, the checker (222) provides a snapshot (e.g., Load Snapshot W (236W), Load Snapshot Z (236Z)) for the load instruction. Each byte of the load snapshot is calculated as follows:

1. If there is a store to the byte's address in the strand's store queue, the byte is sourced from the youngest (in program order) such store. In other words, the store queue corresponding to the strand is initially searched for the byte.
2. If the byte is not sourced as in 1, and if there is a store to the byte's address in the global store buffer (226) from the same strand later (in memory order) than the load, the byte is sourced from the latest (in memory order) such store. In other words, following a failed search of the store queue, the global store buffer (226) is searched for store entries from the same strand later (in memory order) than the load.
3. If the byte is not sourced as in 1 or 2, and if there is a store to the byte's address in the global store buffer (226) earlier (in memory order) than the load, the byte is sourced from the latest (in memory order) such store. This store may be from a different strand. In other words, following a failed search of the global store buffer (226) for stores from the same strand that are later (in memory order) than the load, the global store buffer (226) is searched for stores, including stores from other strands, that are earlier (in memory order) than the load.
4. If the byte is not sourced as in 1-3, the byte is sourced from the shared memory (228).

Those skilled in the art, having the benefit of this detailed description, will appreciate that a speculative load may be discarded without being strand-committed. This results from an out-of-order instruction execution engine.

In one or more embodiments of the invention, the system (200) includes a verification engine (244). The verification engine (244) is configured to compare, for a load instruction executed by a strand (204A, 204B, 204C), the load value retrieved by the simulation of the processor design (202) and the load snapshot generated by the checker (222). If there is a mismatch (i.e., the retrieved load value does not equal the generated load snapshot), this indicates that the processor design does not conform to the memory order satisfying the axioms discussed above in reference to FIG. 1, and/or there exists a bug in the processor design. It is likely, when testing a faulty processor design, that a bug could change a load value, but that there still exists a memory order satisfying the axioms. A checker that merely checks the existence of a valid memory order would fail to detect such a bug. The system (200) implements stronger testing, whereby the load values are compared with the actual value that the architects intended to be loaded, using the existential witness of the memory order (i.e., checker (222)) that the architects wanted the processor design to implement.

Figure 4:
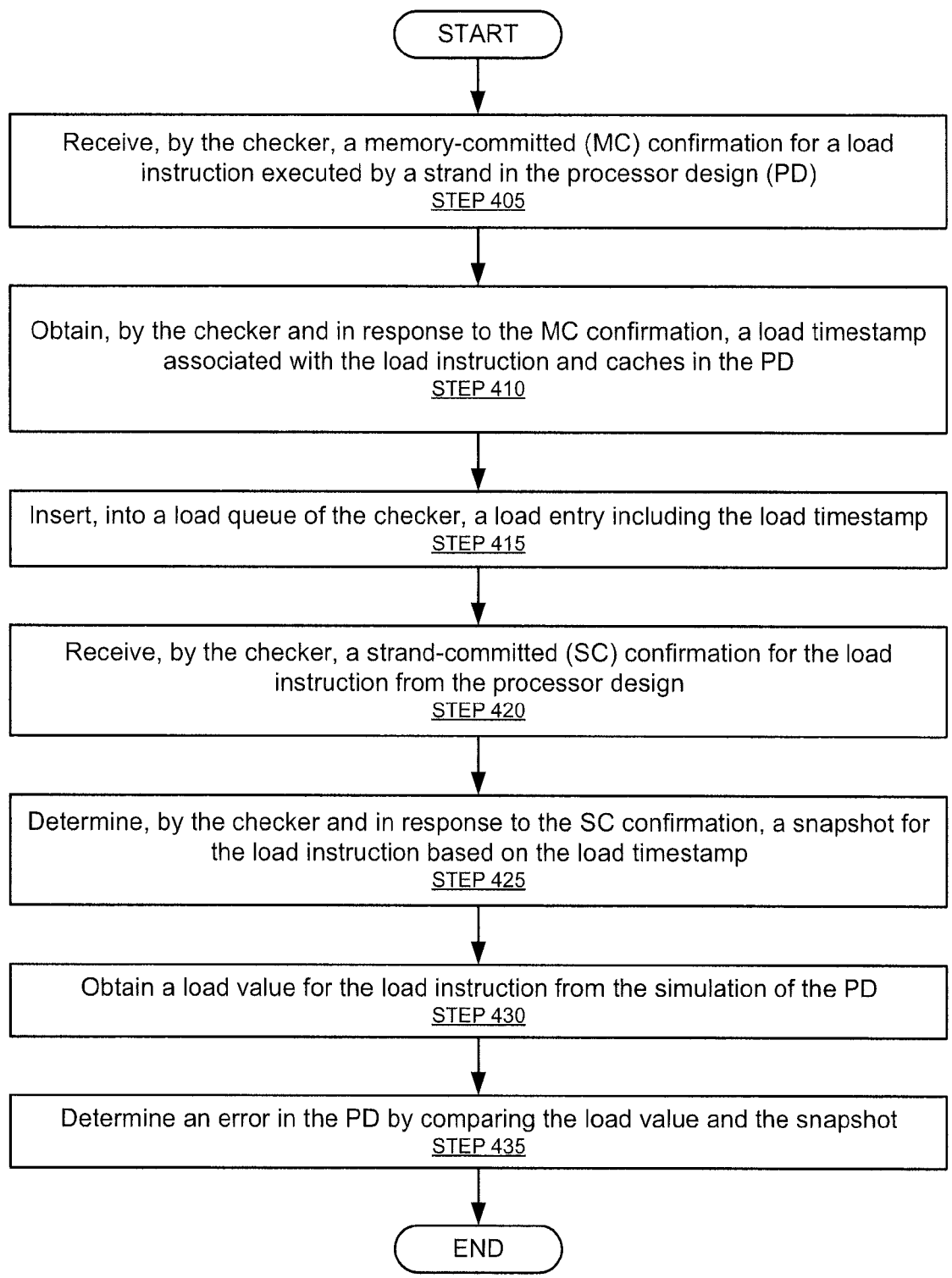
FIG. 4 shows a flowchart in accordance with one or more embodiments of the invention.

FIG. 4 shows a flowchart for verifying a processor design conforms to a memory model in accordance with one or more embodiments of the invention. The process shown in FIG. 4 may be executed, for example, by one or more components (e.g., checker (222), timestamp engine (242), verification engine (244)), discussed above in reference to FIG. 2. One or more steps shown in FIG. 4 may be omitted, repeated, and/or performed in a different order among different embodiments of the invention. Accordingly, embodiments of the invention should not be considered limited to the specific number and arrangement of steps shown in FIG. 4.

Initially, a memory-committed (MC) confirmation for a load instruction is received by a checker (STEP 405). The load instruction is executed by a strand during a simulation of a processor design, and it is the simulation that issues the MC confirmation. As discussed above, memory-committing is a temporal event associated with both load and store instructions. In the case of load instructions, memory-committing marks the point when the load instruction ceases to see the store instructions of other strands in the simulated processor design. As also discussed above, the checker conforms to the memory model.

In STEP 410, a timestamp is obtained for the load instruction. As discussed above, the processor design includes a hierarchy of cache memory with one or more caches within each level of the hierarchy (e.g., one or more L1 caches, one or more L2 caches, one or more L3 caches, etc.). The outermost caches (e.g., L3 caches) may be maintained coherent in real-time. The caches in the other levels of the hierarchy might not be maintained coherent in real-time. Moreover, the L1 caches, the L2 caches, and the L3 caches may be unsynchronized. The timestamp may be a triple: $(t_3, t_2, t_1)$, where $(t_3, t_2)$ is the order stamp pair at the L1 cache and $t_1$ is the time of the memory-committing of the load instruction at the L1 cache. In other words, the timestamp may be obtained by concatenating the order stamp pair and $t_1$.

In STEP 415, a load entry corresponding to the load instruction is inserted into a load queue of the checker. As discussed above, the checker may include one load queue and one store queue for each strand in the simulated processor design. The load entry includes the timestamp for the load instruction. In one or more embodiments of the invention, no data value for the load instruction is determined by the checker at this point.

In STEP 420, a strand-committed (SC) confirmation for the load instruction is received by the checker. It is the simulation of the processor design that issues the SC confirmation. As discussed above, strand-committing is a temporal event associated with both load and store instructions. In the case of load instructions, strand-committing marks the point when the architectural state of the strand is irrevocably updated. Those skilled in the art, having the benefit of this detailed description, will appreciate that not every load instruction will be strand-committed. It is possible that a speculative load instruction will be discarded after being memory-committed but before being strand-committed.

In STEP 425, a snapshot for the load instruction is determined by the checker. The snapshot is the data value for the load instruction as determined by the checker. The snapshot may be determined on a byte-by-byte basis using the timestamp for the load instruction:

1. If there is a store to the byte's address in the strand's store queue, the byte is sourced from the youngest (in program order) such store. In other words, the store queue corresponding to the strand is initially searched for the byte. FIG. 3 and its corresponding description, above, discuss the use of timestamps for resolving memory order.

2. If the byte is not sourced as in 1, if there is a store to the byte's address in the global store buffer of the checker from the same strand later (in memory order) than the load, the byte is sourced from the latest (in memory order) such store. In other words, following a failed search of the store queue, the global store buffer is searched for store entries from the same strand later (in memory order) than the load. FIG. 3 and its corresponding description, above, discuss the use of timestamps for resolving memory order.

3. If the byte is not sourced as in 1 or 2, if there is a store to the byte's address in the global store buffer earlier (in memory order) than the load, the byte is sourced from the latest (in memory order) such store. This store may be from a different strand. In other words, following a failed search of the global store buffer for stores from the same strand that are later (in memory order) than the load, the global store buffer is searched for stores, including stores from other strands, that are earlier (in memory order) than the load. FIG. 3 and its corresponding description, above, discuss the use of timestamps for resolving memory order.

4. If the byte is not sourced as in 1-3, the byte is sourced from the shared memory in the checker.

In one or more embodiments of the invention, the snapshot, once determined, is output by the checker.

Still referring to FIG. 4, in STEP 430, a load value for the load instruction is obtained from the simulated processor design. The load value is outputted by the simulated processor design and/or the simulated processor design is probed to obtain the load value. In one or more embodiments of the invention, both the load value and the snapshot for the load instruction are obtained by a verification engine.

In STEP 435, the load value, as obtained from the simulated processor design, and the snapshot, as obtained from the checker, are compared. If there is a mismatch (i.e., the snapshot does not equal the load value), this indicates an error in the processor design. The error arises because the processor design does not conform to the memory model and/or because the processor design includes a bug that changes the load value.

Figure 5:
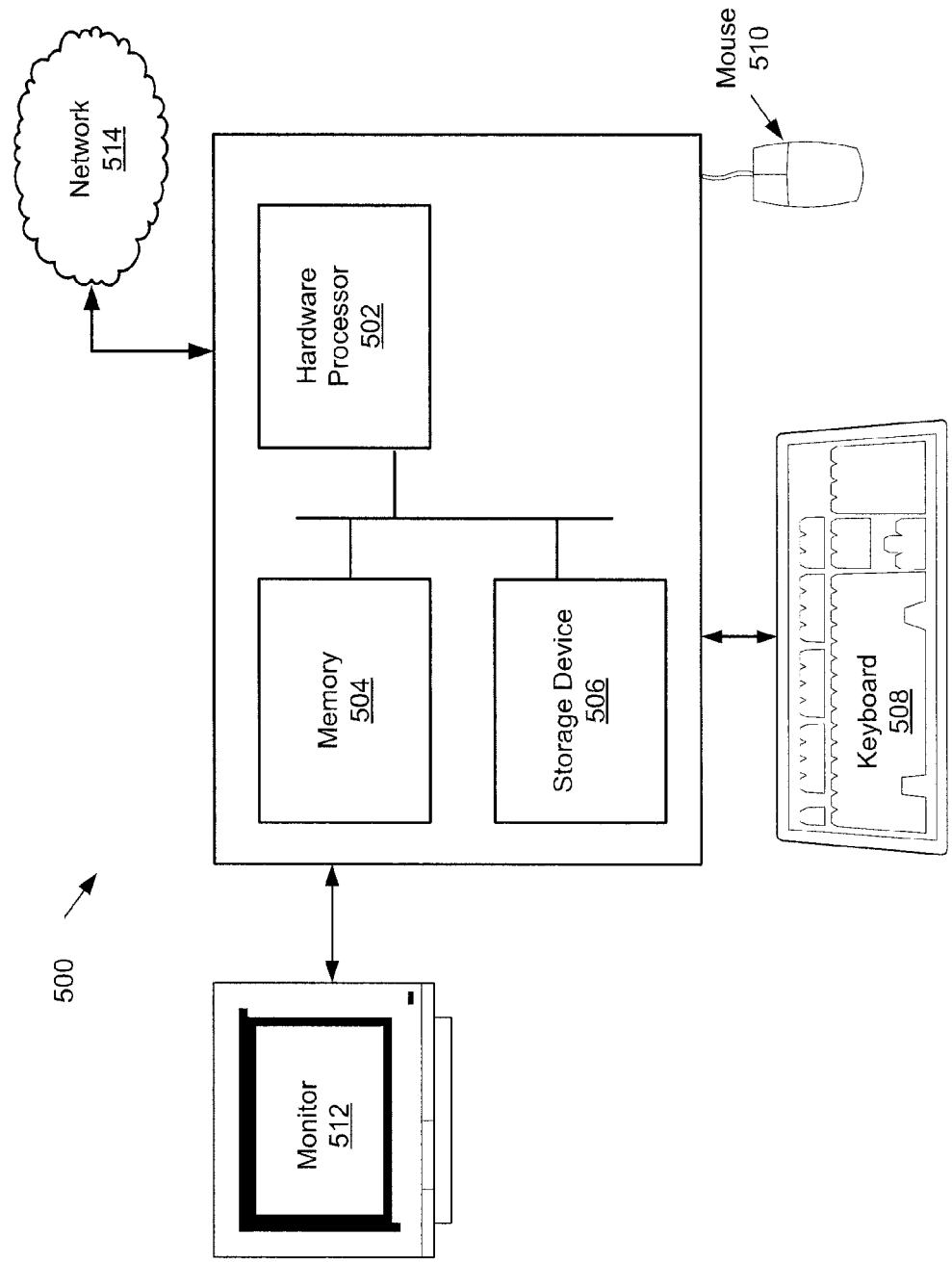
FIG. 5 shows a computer system in accordance with one or more embodiments of the invention.

Embodiments of the invention may be implemented on virtually any type of computer regardless of the platform being used. For example, as shown in FIG. 5, a computer system (500) includes one or more processor(s) (502), an associated memory (504) (e.g. random access memory (RAM), cache memory, flash memory, etc.), a storage device (506) (e.g. a hard disk, an optical drive such as a compact disk drive or digital video disk (DVD) drive, a flash memory stick, etc.), and numerous other elements and functionalities typical of today's computers (not shown). In one or more embodiments of the invention, the processor (502) is hardware. For example, the processor may be an integrated circuit. The computer system (500) may also include input means, such as a keyboard (508), a mouse (510), or a microphone (not shown). Further, the computer system (500) may include output means, such as a monitor (512) (e.g. a liquid crystal display (LCD), a plasma display, or cathode ray tube (CRT) monitor). The computer system (500) may be connected to a network (514) (e.g. a local area network (LAN), a wide area network (WAN) such as the Internet, or any other type of network) via a network interface connection (not shown). In one or more embodiments of the invention, many different types of computer systems exist, and the aforementioned input and output means may take other forms. Generally speaking, the computer system (500) includes at least the minimal processing, input, and/or output means necessary to practice embodiments of the invention.

Further, in one or more embodiments of the invention, one or more elements of the aforementioned computer system (500) may be located at a remote location and connected to the other elements over a network. Further, embodiments of the invention may be implemented on a distributed system having a plurality of nodes, where each portion of the invention (e.g. the computing device, the page rendering device, the display device, etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for verifying that a processor design conforms with a memory model, comprising:

receiving, from a simulation of the processor design and by a checker conforming to the memory model, a memory-committed (MC) confirmation for a load instruction executed by a strand in the processor design;

obtaining, by the checker and in response to the MC confirmation for the load instruction, a load timestamp associated with the load instruction and a plurality of caches in the processor design;

inserting, into a load queue of the checker corresponding to the strand, a load entry comprising the load timestamp in response to the MC confirmation for the load instruction;

receiving, by the checker and after inserting the load entry into the load queue, a strand-committed (SC) confirmation for the load instruction from the simulation of the processor design;

determining, by the checker and in response to the SC confirmation for the load instruction, a snapshot for the load instruction based on the load timestamp;

obtaining a load value for the load instruction from the simulation of the processor design; and determining an error in the processor design by comparing the load value and the snapshot.

2. The method of claim 1, wherein the error corresponds to a mismatch between the load value and the snapshot, and wherein the error is caused by a hardware bug in the processor design.

3. The method of claim 1, wherein the error corresponds to a mismatch between the load value and the snapshot, and wherein the error is caused by a violation of the memory model by the processor design.

4. The method of claim 1, wherein determining the snapshot comprises:
executing, by the checker, a first search within a store queue corresponding to the strand for a first store entry,
wherein the checker comprises the store queue,
wherein the first store entry comprises an address associated within the load instruction, and
wherein the snapshot comprises a data value in the first store entry.

5. The method of claim 4, wherein determining the snapshot further comprises:
executing, by the checker and after a failure of the first search, a second search within a global store buffer for a second store entry,
wherein the checker comprises the global store buffer,
wherein the second store entry is from a store instruction executed by the strand and comprises the address,
wherein the second store entry is memory-ordered later than the load instruction based on a store timestamp of the second store entry and the load timestamp, and
wherein the snapshot comprises a data value from the second store entry.

6. The method of claim 5, wherein determining the snapshot further comprises:
executing, by the checker and after a failure of the second search, a third search within the global store buffer for a third store entry,
wherein the third store entry comprises the address but is not from a store instruction executed by the strand,
wherein the third store entry is memory-ordered earlier than the load instruction based on a store timestamp of the third store entry and the load timestamp, and
wherein the snapshot comprises a data value from the third store entry.

7. The method of claim 6, wherein determining the snapshot further comprises:

accessing, after a failure of the third search, a shared memory in the checker,
wherein the snapshot comprises a data value from the shared memory.

8. The method of claim 1, further comprising:
maintaining an order stamp pair for an L1 cache of the plurality of caches, wherein the L1 cache comprises an L1 clock,
wherein the order stamp pair is updated based on access grants received by the L1 cache from an L2 cache of the plurality of caches, and
wherein obtaining the load timestamp comprises concatenating the order stamp pair with a value of the L1 clock when the load instruction is MC.

9. The method of claim 8, further comprising:
maintaining an L3 timestamp for the L2 cache,
wherein the access grants received by the L1 cache from the L2 cache are timestamped with at least the L3 timestamp for the L2 cache, and
wherein the L3 timestamp for the L2 cache is updated based on access grants received by the L2 cache from an L3 cache of the plurality of caches.

10. The method of claim 9, wherein:
the L1 cache and the L2 cache are not maintained coherent in real-time,
the L3 cache is maintained coherent in real-time, and
the L3 cache, the L2 cache, and the L1 cache are unsynchronized.

11. The method of claim 1, further comprising:
receiving, from the simulation of the processor design and by the checker, an SC confirmation for a store instruction executed by the strand;
inserting, in response to the SC confirmation for the store instruction, a store entry into a store queue of the checker corresponding to the strand;
receiving, from the simulation of the processor design and by the checker, an MC confirmation for the store instruction;
relocating, by the checker and in response to the MC confirmation for the store instruction, the store entry from the store queue to a global store buffer in the checker;
obtaining a store timestamp associated with the store instruction and the plurality of caches in the processor design; and
adding the store timestamp to the store entry in the global store buffer.

12. A system for verifying that a processor design conforms with a memory model, the system comprising:
a hardware processor;
a simulation of the processor design comprising:
a plurality of caches; and
a strand configured to obtain a load value by executing a load instruction;
a timestamp engine configured to generate a load timestamp in response to a memory-committed (MC) confirmation for the load instruction from the simulation;
a checker conforming to the memory model, executing on the hardware processor, and comprising:
a store queue for the strand;
a load queue for the strand configured to store a load entry with the load timestamp in response to the MC confirmation; and
a global store buffer accessed to determine a snapshot for the load instruction in response to a strand-committed (SC) confirmation for the load instruction, wherein the SC confirmation is from the simulation; and a verification engine configured to determine an error in the processor design by comparing the load value and the snapshot.

13. The system of claim 12, wherein the timestamp engine comprises:
an order stamp pair for an L1 cache of the plurality of caches,
wherein the L1 cache comprises an L1 clock,
wherein the order stamp pair is updated based on access grants received by the L1 cache from an L2 cache of the plurality of caches, and
wherein the load timestamp is generated by concatenating the order stamp pair with a value of the L1 clock when the load instruction is MC.

14. The system of claim 13, wherein the timestamp engine further comprises:
an L3 timestamp for the L2 cache,
wherein the access grants received by the L1 cache from the L2 cache are timestamped with the L3 timestamp for the L2 cache,
wherein the L3 timestamp for the L2 cache is updated base on access grants received by the L2 cache from an L3 cache of the plurality of caches, and
wherein the L3 cache, the L2 cache, and the L1 cache are unsynchronized.

15. The system of claim 12, wherein:
the global store buffer comprises a store entry comprising an address associated with the load instruction and a store timestamp,
the store entry is from a store instruction executed by the strand,
the store entry is memory-ordered later than the load instruction based on a store timestamp of the store entry and the load timestamp, and
the snapshot comprises a data value from the store entry.

16. The system of claim 12, wherein:
the global store buffer comprises a store entry comprising an address associated with the load instruction and a store timestamp,
the store entry is from a store instruction not executed by the strand,
the store entry is memory-ordered earlier than the load instruction based on a store timestamp of the store entry and the load timestamp, and
the snapshot comprises a data value from the store entry.

17. The system of claim 12, wherein the store queue comprises a store entry in response to an SC confirmation for a store instruction executed by the strand, and wherein the global store buffer comprises the store entry with a store timestamp following an MC confirmation for the store instruction.

18. A non-transitory computer readable medium (CRM) storing instructions for verifying that a processor design conforms to a memory model, the instructions comprising functionality for:
receiving, from a simulation of the processor design and using a checker conforming to the memory model, a memory-committed (MC) confirmation for a load instruction executed by a strand in the processor design;
obtaining, using the checker and in response to the MC confirmation for the load instruction, a load timestamp associated with the load instruction and a plurality of caches in the processor design;
inserting, into a load queue of the checker corresponding to the strand, a load entry comprising the load timestamp in response to the MC confirmation for the load instruction;
receiving, using the checker and after inserting the load entry into the load queue, a strand-committed (SC) confirmation for the load instruction from the simulation of the processor design;
determining, using the checker and in response to the SC confirmation for the load instruction, a snapshot for the load instruction based on the load timestamp;
obtaining a load value for the load instruction from the simulation of the processor design; and
determining an error in the processor design by comparing the load value and the snapshot.

19. The non-transitory CRM of claim 18, the instructions for determining the snapshot comprising functionality for:
executing a first search within a store queue corresponding to the strand for a first store entry,
wherein the checker comprises the store queue,
wherein the first store entry comprises an address associated within the load instruction;
executing, after a failure of the first search, a second search within a global store buffer for a second store entry,
wherein the checker comprises the global store,
wherein the second store entry is from a store instruction executed by the strand and comprises the address, and
wherein the second store entry is memory-ordered later than the load instruction based on a store timestamp of the second store entry and the load timestamp; and
executing, after a failure of the second search, a third search within the global store buffer for a third store entry,
wherein the third store entry comprises the address but is not from a store instruction executed by the strand, and
wherein the third store entry is memory-ordered earlier than the load instruction based on a store timestamp of the third store entry and the load timestamp.

20. The non-transitory CRM of claim 18, the instructions further comprising functionality for:
maintaining an order stamp pair for an L1 cache of the plurality of caches,
wherein the L1 cache comprises an L1 clock,
wherein the order stamp pair is updated based on access grants received by the L1 cache from an L2 cache of the plurality of caches, and
wherein obtaining the load timestamp comprises concatenating the order stamp pair with a value of the L1 clock when the load instruction is MC; and
maintaining an L3 timestamp for the L2 cache,
wherein the access grants received by the L1 cache from the L2 cache are timestamped with at least the L3 timestamp for the L2 cache,
wherein the L3 timestamp for the L2 cache is updated based on access grants received by the L2 cache from an L3 cache of the plurality of caches, and
wherein the L3 cache, the L2 cache, and the L1 cache are unsynchronized.

* * * * *